(12) United States Patent
Atluri et al.

(10) Patent No.: US 12,319,416 B2
(45) Date of Patent: Jun. 3, 2025

(54) DUAL-CHEMISTRY PROPULSION SYSTEM FOR ELECTRIC VERTICAL TAKE-OFF AND LANDING AIRCRAFT

(71) Applicant: GM Global Technology Operations LLC, Detroit, MI (US)

(72) Inventors: Venkata Prasad Atluri, Novi, MI (US); Madhusudan Raghavan, West Bloomfield, MI (US); Shuonan Xu, Troy, MI (US); Hanho Yun, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 522 days.

(21) Appl. No.: 17/834,423

(22) Filed: Jun. 7, 2022

(65) Prior Publication Data

US 2023/0391460 A1 Dec. 7, 2023

(51) Int. Cl.
| | |
|---|---|
| *H02J 7/00* | (2006.01) |
| *B60L 50/60* | (2019.01) |
| *B60L 53/00* | (2019.01) |
| *B60L 58/12* | (2019.01) |
| *B60L 58/20* | (2019.01) |
| *B64D 27/24* | (2006.01) |
| *B64D 27/34* | (2024.01) |

(52) U.S. Cl.
CPC .............. *B64D 27/24* (2013.01); *B60L 50/66* (2019.02); *B60L 53/00* (2019.02); *B60L 58/12* (2019.02); *B60L 58/20* (2019.02); *B64D 27/34* (2024.01); *B60L 2200/10* (2013.01); *B60L 2210/14* (2013.01); *B64D 2221/00* (2013.01)

(58) Field of Classification Search
CPC .... B64D 2221/00; B64D 27/24; B64D 27/34; B60L 58/12; B60L 58/20; B60L 2200/10; B60L 2210/14; B60L 50/66; B60L 53/00
USPC ............................................. 320/109; 701/22
See application file for complete search history.

(56) References Cited

U.S. PATENT DOCUMENTS

| | | | |
|---|---|---|---|
| 2020/0052349 A1* | 2/2020 | Aikens | .................... B60R 16/03 |
| 2020/0274371 A1* | 8/2020 | Kirleis | ................... B64U 50/19 |

* cited by examiner

*Primary Examiner* — Zixuan Zhou
(74) *Attorney, Agent, or Firm* — CANTOR COLBURN LLP

(57) ABSTRACT

A system in an electric vertical take-off and landing (eV-TOL) aircraft includes two or more subsystems. Each subsystem includes an energy storage systems (ESS). Each ESS is coupled to one or more motors that actuate one or more rotors of the eVTOL aircraft and includes one or more energy sub-packs and one or more power sub-packs. The one or more power sub-packs supply more power than the one or more energy sub-packs and the one or more energy sub-packs supply consistent power for a longer duration than the one or more power sub-packs. The system also includes one or more inter-subsystem switches to electrically isolate or connect adjacent ones of the two or more subsystems.

20 Claims, 5 Drawing Sheets

DUAL-CHEMISTRY PROPULSION SYSTEM FOR ELECTRIC VERTICAL TAKE-OFF AND LANDING AIRCRAFT

INTRODUCTION

The subject disclosure relates to a dual-chemistry propulsion system for an electric vertical take-off and landing (eVTOL) aircraft.

An eVTOL aircraft uses electric power to take off vertically, hover or maneuver, and land vertically. The propulsion system of an eVTOL includes electric motors to operate the rotors that are arranged around the eVTOL and that facilitate its movement. The propulsion system must meet energy requirements while minimizing mass. Accordingly, it is desirable to provide a dual-chemistry propulsion system for an eVTOL aircraft.

SUMMARY

In one exemplary embodiment, a system in an electric vertical take-off and landing (eVTOL) aircraft includes two or more subsystems. Each subsystem includes an energy storage systems (ESS). Each ESS is coupled to one or more motors that actuate one or more rotors of the eVTOL aircraft and includes one or more energy sub-packs and one or more power sub-packs. The one or more power sub-packs supply more power than the one or more energy sub-packs and the one or more energy sub-packs supply consistent power for a longer duration than the one or more power sub-packs. The system also includes one or more inter-subsystem switches to electrically isolate or connect adjacent ones of the two or more subsystems.

In addition to one or more of the features described herein, each ESS is coupled to the one or more motors via a switch.

In addition to one or more of the features described herein, the system also includes a controller to control the switch of each ESS and the one or more inter-subsystem switches.

In addition to one or more of the features described herein, the controller controls the switch of each ESS to be closed during normal operation to couple the ESS to the one or more motors and the controller also controls the switch to be open based on a malfunction in the ESS to isolate the one or more motors from the ESS.

In addition to one or more of the features described herein, the controller controls one of the one or more inter-subsystem switches between adjacent ones of the two or more subsystems to close based on detecting a fault in the ESS of one of the adjacent ones of the two or more subsystems to provide redundancy with the ESS of another of the adjacent ones of the two or more subsystems.

In addition to one or more of the features described herein, each ESS also includes a bi-directional direct current (DC)-DC converter to boost a voltage output by the one or more power sub-packs or to couple the one or more energy sub-packs to the one or more power sub-packs for charging of the one or more power sub-packs.

In addition to one or more of the features described herein, for each ESS, the one or more energy sub-packs and the one or more power sub-packs provide power to the one or more motors during take-off of the eVTOL aircraft.

In addition to one or more of the features described herein, for each ESS, only the one or more energy sub-packs provide power to the one or more motors during cruising of the eVTOL aircraft.

In addition to one or more of the features described herein, the one or more energy sub-packs of each ESS recharge the one or more power sub-packs of the ESS during cruising of the eVTOL aircraft.

In addition to one or more of the features described herein, for each ESS, the one or more energy sub-packs and the one or more power sub-packs provide power to the one or more motors during landing of the eVTOL aircraft.

In another exemplary embodiment, a method of assembling a system in an electric vertical take-off and landing (eVTOL) aircraft includes arranging two or more subsystems. Each subsystem includes an energy storage systems (ESS). The method also includes coupling each ESS to one or more motors that actuate one or more rotors of the eVTOL aircraft, arranging one or more energy sub-packs in each ESS, and arranging one or more power sub-packs in each ESS. The one or more power sub-packs supply more power than the one or more energy sub-packs and the one or more energy sub-packs supply consistent power for a longer duration than the one or more power sub-packs. One or more inter-subsystem switches is controlled to electrically isolate or connect adjacent ones of the two or more subsystems.

In addition to one or more of the features described herein, the coupling each ESS to the one or more motors is via a switch.

In addition to one or more of the features described herein, the method also includes configuring a controller to control the switch of each ESS and the one or more inter-subsystem switches.

In addition to one or more of the features described herein, the configuring the controller includes the controller controlling the switch of each ESS to be closed during normal operation to couple the ESS to the one or more motors and controlling the switch to be open based on a malfunction in the ESS to isolate the one or more motors from the ESS.

In addition to one or more of the features described herein, the configuring the controller includes the controller controlling one of the one or more inter-subsystem switches between adjacent ones of the two or more subsystems to close based on detecting a fault in the ESS of one of the adjacent ones of the two or more subsystems to provide redundancy with the ESS of another of the adjacent ones of the two or more subsystems.

In addition to one or more of the features described herein, the method also includes arranging a bi-directional direct current (DC)-DC converter in each ESS to boost a voltage output by the one or more power sub-packs or to couple the one or more energy sub-packs to the one or more power sub-packs for charging of the one or more power sub-packs.

In addition to one or more of the features described herein, the method also includes configuring the one or more energy sub-packs and the one or more power sub-packs for each ESS to provide power to the one or more motors during take-off of the eVTOL aircraft.

In addition to one or more of the features described herein, the method also includes configuring the one or more energy sub-packs and the one or more power sub-packs for each ESS such that only the one or more energy sub-packs provide power to the one or more motors during cruising of the eVTOL aircraft.

In addition to one or more of the features described herein, the method also includes configuring the one or more energy sub-packs of each ESS to recharge the one or more power sub-packs of the ESS during cruising of the eVTOL aircraft.

In addition to one or more of the features described herein, the method also includes configuring the one or more energy sub-packs and the one or more power sub-packs for each ESS to provide power to the one or more motors during landing of the eVTOL aircraft.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
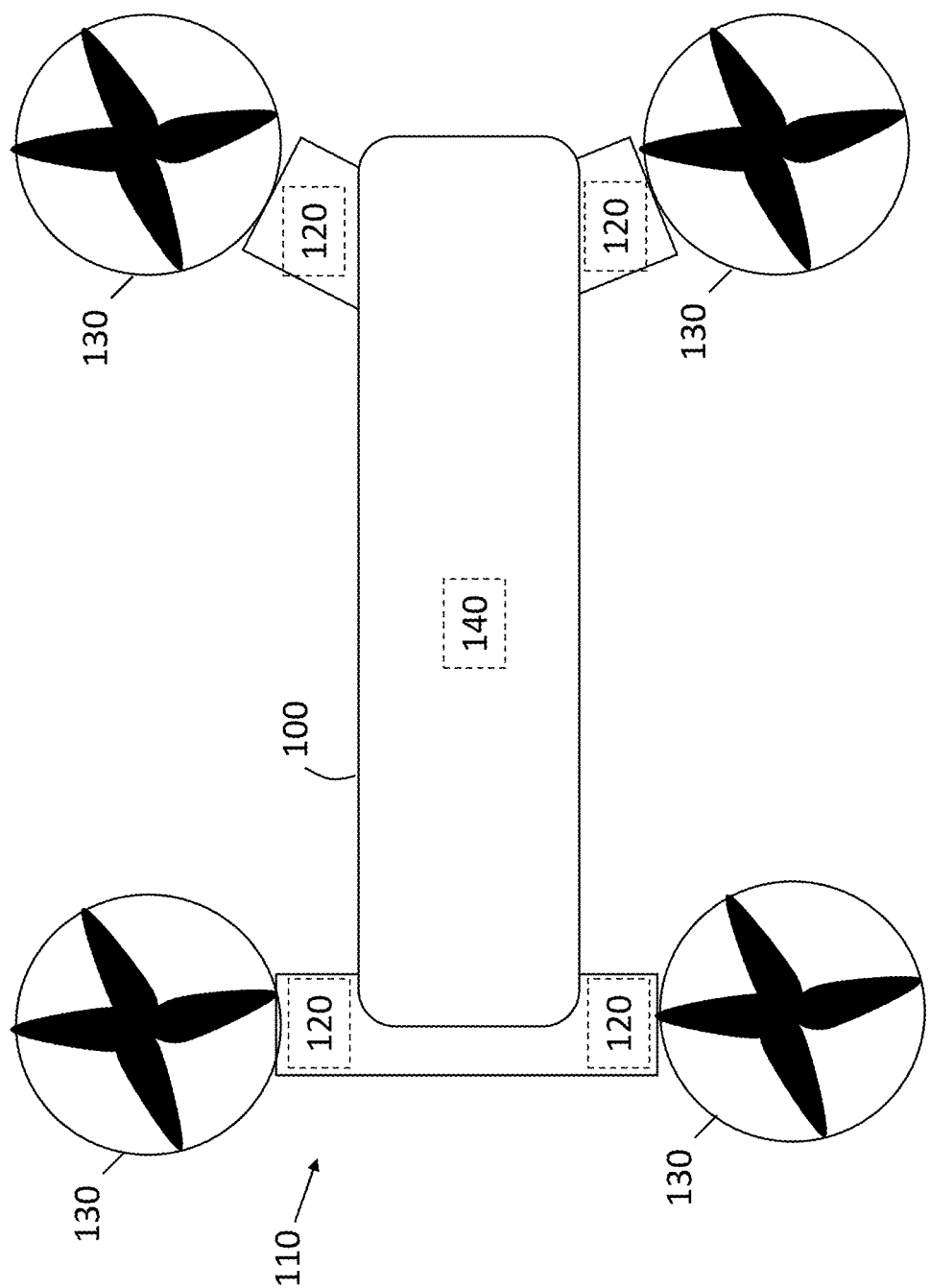
FIG. 1 is a block diagram of an electric vertical take-off and landing (eVTOL) aircraft with a dual-chemistry propulsion system according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to a dual-chemistry propulsion system for an eVTOL aircraft. Dual chemistry refers to the fact that energy cells and power cells are both used. While both energy cells and power cells generally generate electricity from chemical reactions (i.e., generate and store energy in one step), they exhibit structural differences in their electrodes. Relatively, power cells include an electrode formed from a porous material and a thinner coating. This allows rapid movement of ions into and out of the electrode (resulting in higher power output). By contrast, energy cells include an electrode formed from a denser material and a thicker coating. This hinders the movement of ions into and out of the electrode (limiting power output). Energy cells typically deliver sustained, continuous current over a long duration, while power cells typically deliver high current loads over a short duration at intermittent intervals.

The architecture detailed for the dual-chemistry propulsion system facilitates mode selection to use the energy cells and power cells to their best advantage at each of the different stages (e.g., take-off, cruising (i.e., hover or maneuver in the air), landing) of eVTOL aircraft operation. A plurality of power packs provides on-demand power via direct current (DC)-to-DC converters. The DC-DC converters are bi-directional such that, in addition to redundancy, the power packs facilitate charging of the energy packs. A controller controls switches of the dual-chemistry propulsion system, as detailed.

In accordance with an exemplary embodiment, FIG. 1 is a block diagram of an eVTOL aircraft 100 with a dual-chemistry propulsion system 110. The exemplary eVTOL aircraft 100 is shown with four rotors 130, but any number of rotors 130 may be present according to alternate embodiments. The dual-chemistry propulsion system 110, which is further detailed with reference to FIG. 2, includes motors 120 that drive the rotors 130 to implement take-off, cruising, and landing operations by the eVTOL aircraft 100. A controller 140 that may be entirely part of the dual-chemistry propulsion system 110 or may be coupled to the dual-chemistry propulsion system 110 as indicated.

The controller 140 may control switches discussed for the dual-propulsion chemistry system 110 based on a mode or a malfunction, as detailed. The controller 140 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 140 may also include a non-transitory computer-readable medium that stores instructions which are processed by one or more processors of the controller 140 to implement the processes discussed with reference to FIG. 5.

Figure 2:
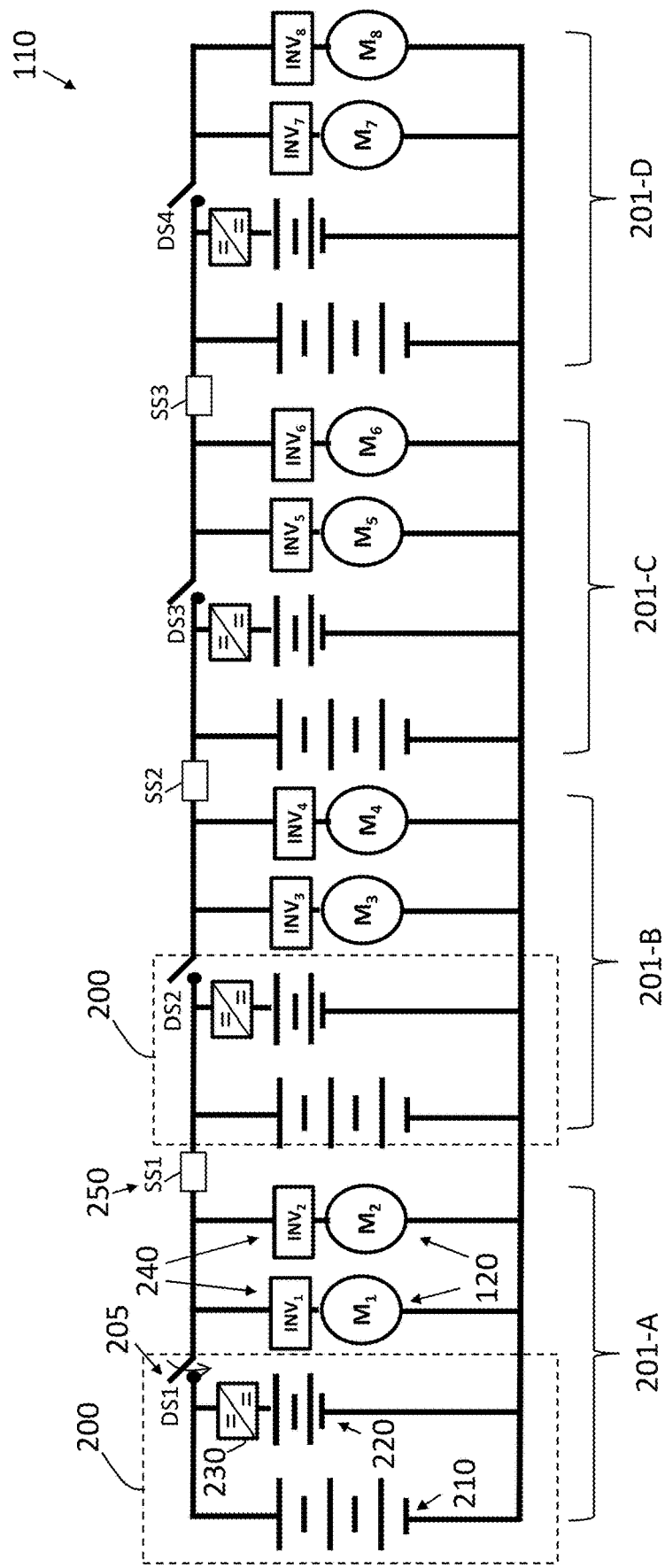
FIG. 2 is a schematic diagram of a dual-chemistry propulsion system for an eVTOL aircraft according to one or more embodiments.

FIG. 2 is a schematic diagram of a dual-chemistry propulsion system 110 for an eVTOL aircraft 100 according to one or more embodiments. The exemplary dual-chemistry propulsion system 110 shown in FIG. 2 includes four subsystems 201-A, 201-B, 201-C, and 201-D (generally referred to as 201). The four subsystems 201 may drive eight rotors 130, double the number of rotors 130 shown for the exemplary eVTOL aircraft 100 in FIG. 1, for example. That is, in the exemplary illustration, each of the subsystems 201 is shown to include two motors 120. However, as further discussed, any number of variations of this exemplary dual-chemistry propulsion system 110 are contemplated.

Adjacent ones of the subsystems 201 are separated by one of the inter-subsystem switches 250 labeled as switches SS1, SS2, and SS3. For example, subsystem 201-A and subsystem 201-B are separated by switch SS1, one of the inter-subsystem switches 250. During normal operation, all of the inter-subsystem switches 250 are open such that each of the rotors 130 is independently coupled to one of the subsystems 201 (i.e., the subsystems 201 are electrically isolated). However, when one of the subsystems 201 has a malfunction, a corresponding inter-subsystem switch 250 (switch SS1, SS2, or SS3) may be closed to provide a redundant propulsion energy source for the affected rotor 130. The inter-subsystem switches 250 may be controlled by the controller 140 to provide this redundancy.

The components of only one of the subsystems 201-A are labeled for readability and are discussed. As FIG. 2 indicates each of the subsystems 201 includes the same components. As shown, the subsystem 201-A includes a dual-chemistry energy storage system (ESS) 200, two motors 120, labeled as motors $M_1$ and $M_2$, with corresponding inverters 240, labeled as $INV_1$ and $INV_2$. The inverters 240 convert DC power from the dual-chemistry ESS 200 into alternating current (AC) power used to run the electric motors 120. According to alternate embodiments, each subsystem 201 may include only one motor 120 or more than two motors 120 based on the power supplied by each dual-chemistry ESS 200 and required by each motor 120.

The dual-chemistry ESS 200 includes an energy sub-pack 210, a power sub-pack 220, and a DC-DC converter 230. According to alternate embodiments, the dual-chemistry ESS 200 may include two, three, or any other number of energy sub-packs 210 in parallel. In addition, the dual-chemistry ESS 200 may include two, three, or any number of power sub-packs 220 in parallel, which may require additional DC-DC converters 230. A higher number of energy sub-packs 210 and/or power sub-packs 220 may increase resolution and redundancy, but this increase must be balanced with the accompanying increase in weight and complexity.

As previously noted, the energy sub-pack 210 may provide a sustained current for a longer period as compared with the power sub-pack 220, and the power sub-pack 220 may provide a higher current over a short duration as compared with the energy sub-pack 210. According to an exemplary embodiment, the energy sub-pack 210 voltage may be 800 volts (V) and the power sub-pack 220 voltage may be 400 V to 600 V. The DC-DC converter 230 is bi-directional such that it boosts the voltage of the power sub-pack 220 so that the power sub-pack 220 may supply the motors 120 or facilitates charging of the power sub-pack 220 by the energy sub-pack 210. In alternate embodiments, the power sub-pack 220 voltage may also be 800 V and the DC-DC converter 230 may regulate voltages between the power sub-pack 220 and the energy sub-pack 210.

As shown in FIG. 2, each of the subsystems 201 includes a subsystem switch 205 labeled as switch DS1, DS2, DS3, or DS4. The subsystem switch 205 of each subsystem 201 may be closed to electrically connect the dual-chemistry ESS 200 of the subsystem 201 to the motors 120 of the subsystem 201. While the inter-subsystem switches 250 are open during normal operation to facilitate independent operation of the various subsystems 201, the subsystem switches 205 are closed during normal operation to facilitate coupling of the motors 120 of the subsystem 201 to the dual-chemistry ESS 200 of the subsystem 201.

If a given subsystem 201 has a malfunction in its dual-chemistry ESS 200, the controller 140 may open the subsystem switch 205 of the given subsystem 201 to decouple the faulty dual-chemistry ESS 200 from the motors 120. The controller 140 may then close the corresponding inter-subsystem switch 250 to power the affected motors 120 with the dual-chemistry ESS 200 of an adjacent subsystem 201. For example, if the dual-chemistry ESS 200 of the subsystem 201-A exhibits an issue, the controller 140 may open the subsystem switch 205 labeled as switch DS1 to isolate the faulty dual-chemistry ESS 200 from the motors 120 labeled as motors $M_1$ and $M_2$. The controller 140 may then close the inter-subsystem switch 250 labeled as SS1 so that the motors 120 labeled as motors $M_1$ and $M_2$ are coupled to the dual-chemistry ESS 200 of the subsystem 201-B.

Figure 3:
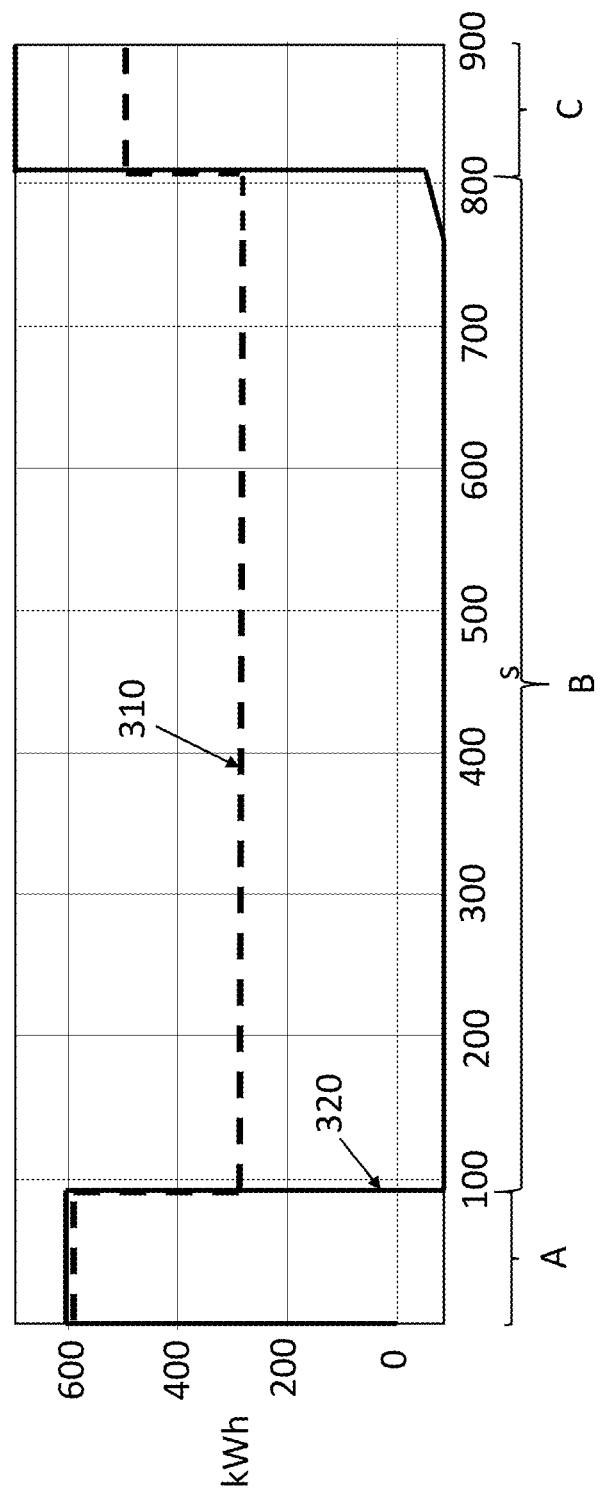
FIG. 3 is a graph indicating power supplied by a dual-chemistry ESS according to an exemplary embodiment.

FIG. 3 is a graph indicating power supplied by a dual-chemistry ESS 200 according to an exemplary embodiment. Time in seconds (s) is indicated along one axis and power in kilowatt hours (kWh) is indicated along a perpendicular axis, as shown. The time period that is shown in FIG. 3 is subdivided into periods A, B, and C. The period A is associated with a duration of take-off of the eVTOL aircraft 100. The period B is associated with cruising, and the period C is associated with landing the eVTOL aircraft 100. The energy sub-pack power output 310 is indicated with a dashed line, and the power sub-pack power output 320 is indicated with a solid line.

As shown, during take-off (i.e., period A), the power sub-pack power output 320 is slightly higher than the energy sub-pack power output 310 but both consistently supply power to the corresponding motors 120 during take-off. During cruising (i.e., period B), only the energy sub-pack 210 supplies the motors 120 of the dual-chemistry ESS 200. As shown, the power sub-pack power output 320 is zero. During landing (i.e., period C), the power supply is similar to that of take-off (i.e., period A). Both the energy sub-pack 210 and the power sub-pack 220 supply power but the power sub-pack power output 320 is slightly higher.

Figure 4:
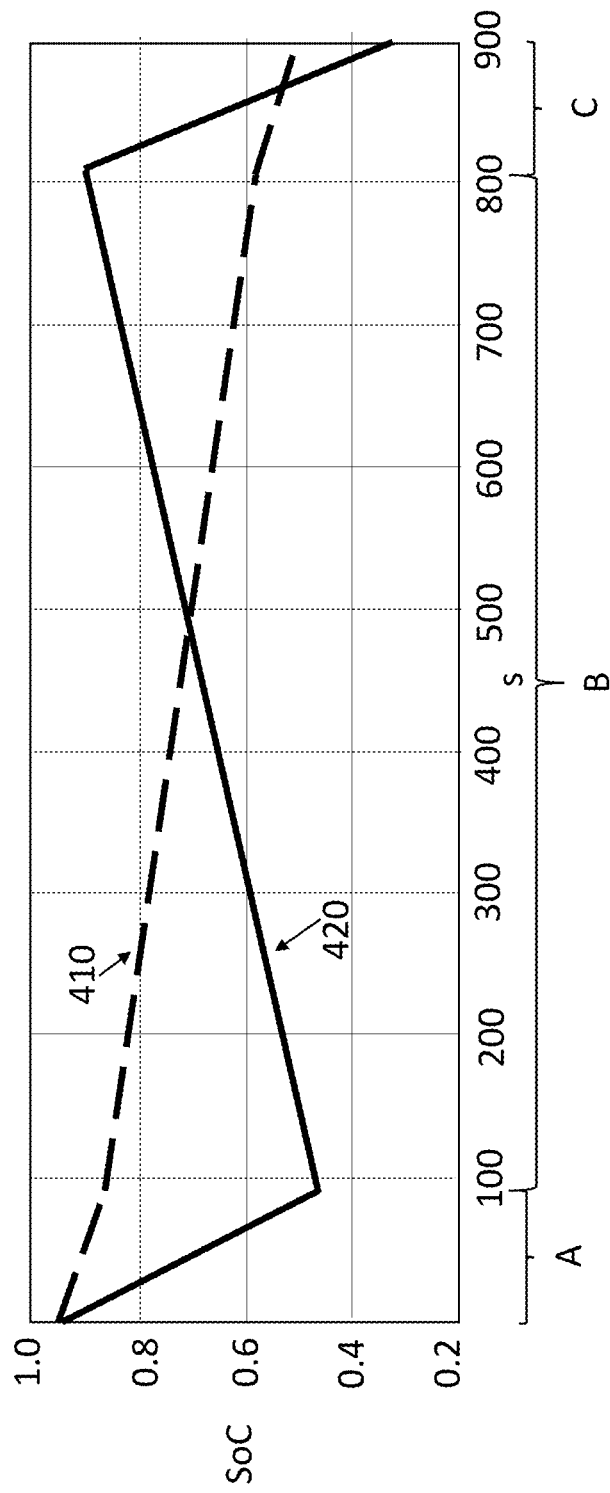
FIG. 4 is a graph indicating state of charge (SoC) of an energy sub-pack and a power sub-pack of an exemplary dual-chemistry ESS according to an exemplary embodiment.

FIG. 4 is a graph indicating state of charge (SoC) of the energy sub-pack 210 and the power sub-pack 220 of an exemplary dual-chemistry ESS 200 according to an exemplary embodiment. Time in seconds (s) is indicated along one axis and SoC is indicated along a perpendicular axis, as shown. The time period is subdivided into periods A, B, and C corresponding, respectively, with take-off, cruising, and landing, as in FIG. 3. The energy sub-pack SoC 410 is indicated with a dashed line, and the power sub-pack SoC 420 is indicated with a solid line. As shown, during take-off (i.e., period A), both the energy sub-pack SoC 410 and the power sub-pack SoC 420 are reduced. This is because charge is used up as each supplies continuous power, as indicated in FIG. 3. As also indicated in FIG. 3, the power sub-pack power output 320 is higher than the energy sub-pack power output 310. Thus, the power sub-pack SoC 420 decreases more than the energy sub-pack SoC 410 during take-off (i.e., period A).

During cruising (i.e., period B), the energy sub-pack 210 charges the power sub-pack 220. As previously noted, this is facilitated via the bi-directional DC-DC converter 230. Thus, the energy sub-pack SoC 410 decreases while the power sub-pack SoC 420 increases over period B. During landing (i.e., period C), as during take-off (i.e., period A), both the energy sub-pack 210 and the power sub-pack 220 supply power to the motors 120 of the dual-chemistry ESS 200. However, as shown in FIG. 3, the power sub-pack power output 320 is higher than the energy sub-pack power output 310. Thus, as shown, both the energy sub-pack SoC 410 and the power sub-pack SoC 420 decrease, but the power sub-pack SoC 420 reduction is higher than the reduction in the energy sub-pack SoC 410.

Figure 5:
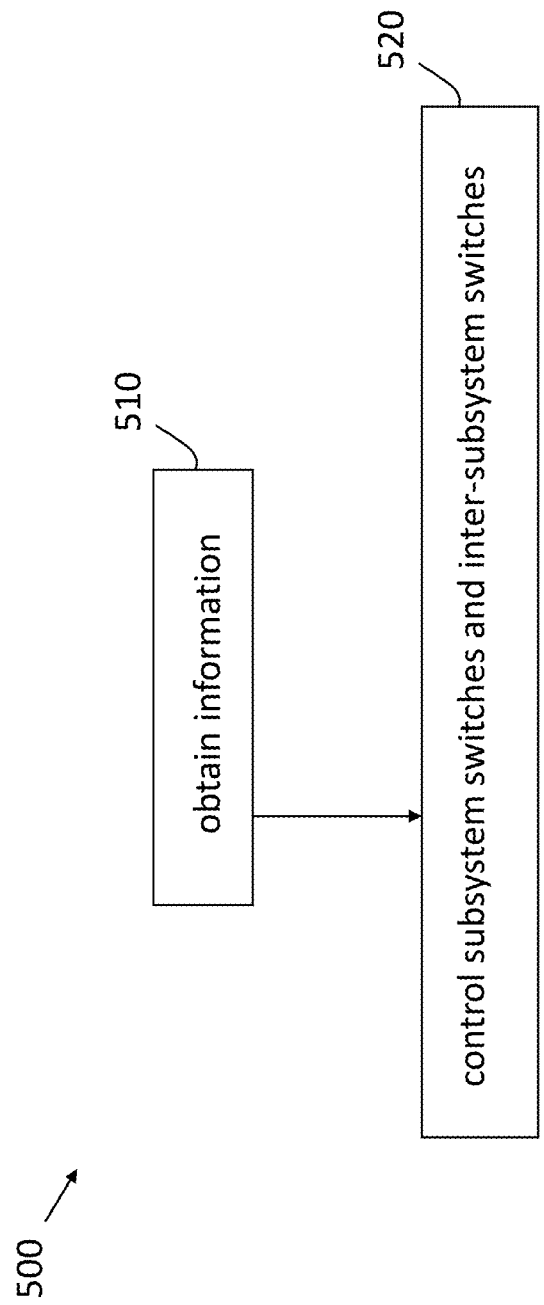
FIG. 5 is a process flow of processes implemented by the controller according to one or more embodiments.

FIG. 5 is a process flow 500 of processes implemented by the controller 140 according to one or more embodiments. At block 510, the processes include obtaining information. The information may indicate the period of operation (A, B, or C) as shown in FIG. 3, for example, or may indicate a malfunction in an ESS 200. Based on the information, at block 520, the controller 140 may control one or more subsystem switches 205 or inter-subsystem switches 250 as previously detailed.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system in an electric vertical take-off and landing (eVTOL) aircraft comprising:
    two or more subsystems, each subsystem of the two or more subsystems including an energy storage systems (ESS), each ESS being coupled to one or more motors that actuate one or more rotors of the eVTOL aircraft:
        each ESS comprising one or more energy sub-packs, and
        each ESS comprising one or more power sub-packs, wherein the one or more power sub-packs supply more power than the one or more energy sub-packs and the one or more energy sub-packs supply consistent power for a longer duration than the one or more power sub-packs;
    each ESS being coupled to the one or more motors via a switch;
a set of one or more inter-subsystem switches, each inter-subsystem switch in the set of inter-subsystem switches connecting adjacent ones of the two or more subsystems while the inter-subsystem switch is in a closed state and isolating the adjacent ones of the two or more subsystems while the inter-subsystem switch is in an open state, and
wherein each of the two or more subsystems is configured to receive power from the ESS of a connected adjacent one of the two or more subsystems through an inter-subsystem switch of the set of inter-subsystem switches;
a controller configured to control the switch of each ESS and the one or more inter-subsystem switches; and
wherein the controller is configured to respond to a fault detected in a first of the two or more subsystems by controlling a first of the one or more inter-subsystem switches closed such that a second of the two or more subsystems is connected to the first of the two or more subsystems via the first of the one or more inter-subsystem switches.

2. The system according to claim 1, wherein the controller is configured to control the switch of each ESS to be closed during normal operation to couple the ESS to the one or more motors and the controller is configured to control the switch to be open based on a malfunction in the ESS to isolate the one or more motors from the ESS.

3. The system according to claim 1, wherein each ESS further comprises a bi-directional direct current (DC)-DC converter configured to boost a voltage output by the one or more power sub-packs or to couple the one or more energy sub-packs to the one or more power sub-packs for charging of the one or more power sub-packs.

4. The system according to claim 1, wherein, for each ESS, the one or more energy sub-packs and the one or more power sub-packs are configured to provide power to the one or more motors during take-off of the eVTOL aircraft.

5. The system according to claim 1, wherein, for each ESS, only the one or more energy sub-packs are configured to provide power to the one or more motors during cruising of the eVTOL aircraft.

6. The system according to claim 5, wherein the one or more energy sub-packs of each ESS are also configured to recharge the one or more power sub-packs of the ESS during cruising of the eVTOL aircraft.

7. The system according to claim 1, wherein, for each ESS, the one or more energy sub-packs and the one or more power sub-packs are configured to provide power to the one or more motors during landing of the eVTOL aircraft.

8. The system according to claim 1, wherein the one or more motors that actuate one or more rotors of the eVTOL aircraft comprises two or more motors.

9. The system of claim 2, wherein the malfunction in the ESS is a detected fault, and wherein responsive to detecting the fault in the one of the ESS, the controller is configured to control the switch to be open based on the malfunction in the ESS to isolate the one or more motors from the ESS prior to controlling the first of the one or more inter-subsystem switches closed.

10. The system according to claim 1, wherein the one or more motors that actuate one or more rotors of the eVTOL aircraft consists of two motors.

11. A method of assembling a system in an electric vertical take-off and landing (eVTOL) aircraft comprising:
    arranging two or more subsystems, each including an energy storage systems (ESS), and coupling each ESS to one or more motors that actuate one or more rotors of the eVTOL aircraft;
    arranging one or more energy sub-packs in each ESS;
    arranging one or more power sub-packs in each ESS, wherein the one or more power sub-packs supply more power than the one or more energy sub-packs and the one or more energy sub-packs supply consistent power for a longer duration than the one or more power sub-packs; and
    each ESS being coupled to the one or more motors via a switch;
a set of one or more inter-subsystem switches, each inter-subsystem switch in the set of inter-subsystem switches connecting adjacent ones of the two or more subsystems while the inter-subsystem switch is in a closed state and isolating the adjacent ones of the two or more subsystems while the inter-subsystem switch is in an open state, and
wherein each of the two or more subsystems is configured to receive power from the ESS of a connected adjacent one of the two or more subsystems through an inter-subsystem switch of the set of inter-subsystem switches;
a controller configured to control the switch of each ESS and the one or more inter-subsystem switches; and
wherein the controller is configured to respond to a fault detected in a first of the two or more subsystems by controlling a first of the one or more inter-subsystem switches closed such that a second of the two or more subsystems is connected to the first of the two or more subsystems via the first of the one or more inter-subsystem switches.

12. The method according to claim 11, wherein the coupling each ESS to the one or more motors is via a switch.

13. The method according to claim 12, wherein the configuring the controller includes the controller controlling the switch of each ESS to be closed during normal operation to couple the ESS to the one or more motors and controlling the switch to be open based on a malfunction in the ESS to isolate the one or more motors from the ESS.

14. The method according to claim 11, further comprising arranging a bi-directional direct current (DC)-DC converter in each ESS to boost a voltage output by the one or more power sub-packs or to couple the one or more energy sub-packs to the one or more power sub-packs for charging of the one or more power sub-packs.

15. The method according to claim 11, further comprising configuring the one or more energy sub-packs and the one or more power sub-packs for each ESS to provide power to the one or more motors during take-off of the eVTOL aircraft.

16. The method according to claim 11, further comprising configuring the one or more energy sub-packs and the one or more power sub-packs for each ESS such that only the one or more energy sub-packs provide power to the one or more motors during cruising of the eVTOL aircraft.

17. The method according to claim 16, further comprising configuring the one or more energy sub-packs of each ESS to recharge the one or more power sub-packs of the ESS during cruising of the eVTOL aircraft.

18. The method according to claim 11, further comprising configuring the one or more energy sub-packs and the one or more power sub-packs for each ESS to provide power to the one or more motors during landing of the eVTOL aircraft.

19. The method according to claim 11, wherein the one or more motors that actuate one or more rotors of the eVTOL aircraft comprises two or more motors.

20. The method according to claim 13, wherein the malfunction in the ESS is a detected fault, and wherein responsive to detecting the fault in the one of the ESS, the controller is configured to control the switch to be open based on the malfunction in the ESS to isolate the one or more motors from the ESS prior to controlling the first of the one or more inter-subsystem switches closed.

* * * * *